United States Patent
Peitz

(10) Patent No.: US 9,452,790 B2
(45) Date of Patent: Sep. 27, 2016

(54) VEHICLE COMPONENT

(71) Applicant: Dr. Ing. h.c. F. Porsche Aktiengesellschaft, Stuttgart (DE)

(72) Inventor: Volker Peitz, Vaihingen/Riet (DE)

(73) Assignee: Dr. Ing. h.c.F. Porsche Aktiengesellschaft, Stuttgart (DE)

( * ) Notice: Subject to any disclaimer, the term of this patent is extended or adjusted under 35 U.S.C. 154(b) by 436 days.

(21) Appl. No.: 14/101,383

(22) Filed: Dec. 10, 2013

(65) Prior Publication Data
US 2014/0170342 A1    Jun. 19, 2014

(30) Foreign Application Priority Data
Dec. 18, 2012   (DE) .................. 10 2012 112 540

(51) Int. Cl.
| B62D 25/20 | (2006.01) |
| B62D 29/00 | (2006.01) |
| B29K 705/10 | (2006.01) |
| B29K 705/02 | (2006.01) |
| B29L 31/30 | (2006.01) |

(52) U.S. Cl.
CPC ............ *B62D 25/20* (2013.01); *B62D 29/005* (2013.01); *B29K 2705/02* (2013.01); *B29K 2705/10* (2013.01); *B29L 2031/30* (2013.01); *Y10T 428/13* (2015.01); *Y10T 428/24777* (2015.01); *Y10T 428/24802* (2015.01); *Y10T 428/24851* (2015.01); *Y10T 428/24917* (2015.01)

(58) Field of Classification Search
CPC ................ B62D 25/20; B62D 29/005; Y10T 428/24917; Y10T 428/24851; Y10T 428/24777; Y10T 428/13; Y10T 428/24802; B29K 2705/10; B29K 2705/02; B29L 2031/30
See application file for complete search history.

(56) References Cited

U.S. PATENT DOCUMENTS 8,073,298 B2 * 12/2011 Meidar .................. B29C 70/72
                                                       385/101
2006/0086016 A1   4/2006 Cornell et al.
2014/0080960 A1 * 3/2014 Konagai ................. C08J 5/042
                                                       524/495

FOREIGN PATENT DOCUMENTS

| CN | 101720293 | 6/2010 |
| DE | 2211185 | 9/1972 |
| DE | 33 37 596 | 4/1985 |
| DE | 41 15 971 | 11/1992 |
| DE | 42 10 589 | 10/1993 |
| DE | 100 37 393 | 2/2002 |
| EP | 1 630 074 | 3/2006 |

* cited by examiner

*Primary Examiner* — Michael C Miggins
(74) *Attorney, Agent, or Firm* — Gerald E. Hespos; Michael J. Porco; Matthew T. Hespos

(57) ABSTRACT

A vehicle component (3, 11) for a motor vehicle body has at least one line (6, 7, 12, 13, 14) integrated in the vehicle component (3, 11). The vehicle component (3, 11) is formed from a fiber composite material and the at least one line (6, 7, 11, 12, 13) is laminated into the vehicle component (3, 11).

15 Claims, 3 Drawing Sheets

VEHICLE COMPONENT

CROSS REFERENCE TO RELATED APPLICATION

This application claims priority under 35 USC 119 to German Patent Appl. No. 10 2012 112 540.6 filed on Dec. 18, 2012, the entire disclosure of which is incorporated herein by reference.

BACKGROUND

1. Field of the Invention

The invention relates to a vehicle component, in particular to a vehicle component having at least one integrated line.

2. Description of the Related Art

The body of a motor vehicle generally is manufactured from a large number of structural components that are connected to one another. Vehicles also have a large number of lines that are laid in the vehicle to establish connections between various locations in the body. For example, electrical lines supply electrical energy to a large number of electrical loads and control units and allow the control units and/or loads to communicate with one another. Lines for transporting media, such as gases or liquids, also are provided.

DE 33 37 596 C2 discloses laying cables for the on-board electrical system beneath the vehicle carpet in the interior. The cables are laid in a molded unit that is composed of a foamed body.

DE 100 37 393 A1 discloses the arrangement of a line in a hollow channel that has foamed supporting means.

DE 41 15 971 A1 discloses a line arranged between two metal sheets where a hollow space between the two sheets is filled by a foam.

DE 42 10 589 C2 and EP 1 630 074 A1 disclose a line arranged in a cutout in a load-bearing beam or on an underbody. A holding plate is screwed to the load-bearing beam or to the underbody and holds the line in a receptacle of the load-bearing beam or the underbody.

Arrangement and fastening of lines is highly complex because additional vehicle components must be fit with the lines for receiving and holding purposes.

Therefore, an object of the invention is to provide a vehicle component with an integrated line that is simple to produce and securely holds the line or lines.

SUMMARY OF THE INVENTION

The invention relates to a vehicle component for a motor vehicle body with at least one line integrated in the vehicle component. The vehicle component is formed from a fiber composite material and the line is integrated, such as, laminated into the vehicle component. As a result, the line already is integrated into the vehicle component during the production process and no additional elements are required because the lines are integrated with the material from which the vehicle component is produced.

The vehicle component preferably has a plurality of layers of the fiber composite material, and the at least one line is arranged between layers of the fiber composite material. As a result, the line integrated in an optimum manner.

The fiber composite material preferably is a carbon fiber-reinforced plastic that has a plurality of layers of carbon fibers. This provides a particularly lightweight yet very stable construction. The arrangement of the layers provides good molding properties.

The line preferably is an electrical line that advantageously is insulated by an electrical insulation. However, the line also may be integrated in a non-insulated manner.

The line may be a high-voltage line. A high voltage is one of more than 60 V in the case of DC voltages, and of more than 25 V in the case of AC voltages. The line can be used for supplying high-voltage in a range of approximately 60 V to approximately 400 V. Other voltage ranges also are possible.

The line may comprise a solid metal rod (for example a busbar), and may be formed from aluminum. As an alternative, the line may be a tube or of wires. However, the solid rod has the advantage of a high degree of rigidity and a large line cross section.

Insulation enables the line to be insulated electrically from other elements. The insulation can be fit on the line before the line is incorporated, for example incorporated by lamination.

The line of the vehicle component may project at least on one side or on both sides of the vehicle component to simplify connection to an electrical circuit by connections outside the vehicle part.

The protruding regions preferably are covered by a removable covering. As a result, the connection region of the line can be protected during further processing steps. The protection can be removed for connection of the line.

The vehicle component may be at least part of a central tunnel, a vehicle floor or of a vehicle wall. Other applications include the underbody paneling, front/rear apron and interior components.

The invention will be explained in greater detail below using an exemplary embodiment with reference to the drawing.

DETAILED DESCRIPTION OF THE PREFERRED EMBODIMENTS

Figure 1:
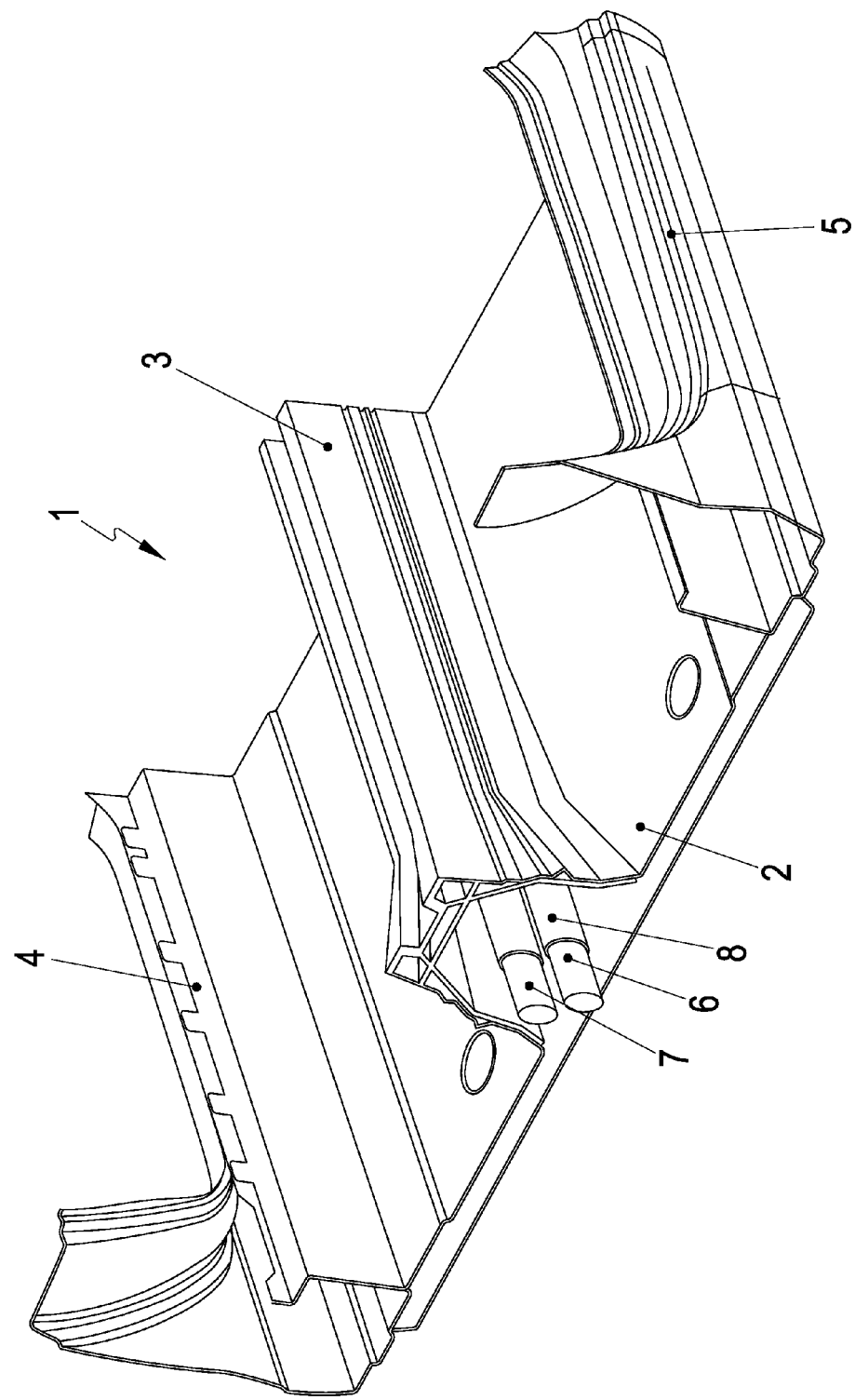
FIG. 1 is a schematic illustration of a vehicle part, such as, in particular, a floor assembly comprising a central tunnel with a line arranged therein.

FIG. 1 shows a floor assembly 1 of a vehicle floor produced with a hybrid construction. The floor assembly 1 has a central floor region 2 comprising a central tunnel 3, and also has lateral floor regions 4 and 5. The central tunnel 3 is a vehicle component in an exemplary embodiment of the invention.

The lateral floor regions 4, 5 are in the form of beams that are connected to the floor 2. In this case, the two outer lateral floor regions 4, 5 are of metal construction, for example manufactured from aluminum or steel. The central floor region 2 including the central tunnel 3 is formed with a construction comprising a fiber composite material. Electrical lines 6, 7 are integrated into the central tunnel 3.

The fiber composite material of the central tunnel 3 has layers of fiber composite material laid one above the other and connected by a plastic.

The fiber composite material is preferably a carbon fiber-reinforced plastic, with a large number of layers of carbon fibers being used.

The lines 6, 7 are inserted into the layers of the fiber composite material of the central tunnel so that the lines 6, 7 are laminated into the vehicle component.

The lines 6, 7 are electrical lines, such as high-voltage lines. In the exemplary embodiment of FIG. 1, the lines are solid metal with an insulation 8.

The insulation 8 of the lines 6, 7 already is provided on the lines before the lines 6, 7 are incorporated by lamination. Thus, the lines 6, 7 are laminated into the central tunnel 3 with the insulation in the exemplary embodiment of FIG. 1.

As an alternative, the lines 6, 7 can be gas-carrying or liquid-carrying lines.

Figure 2:
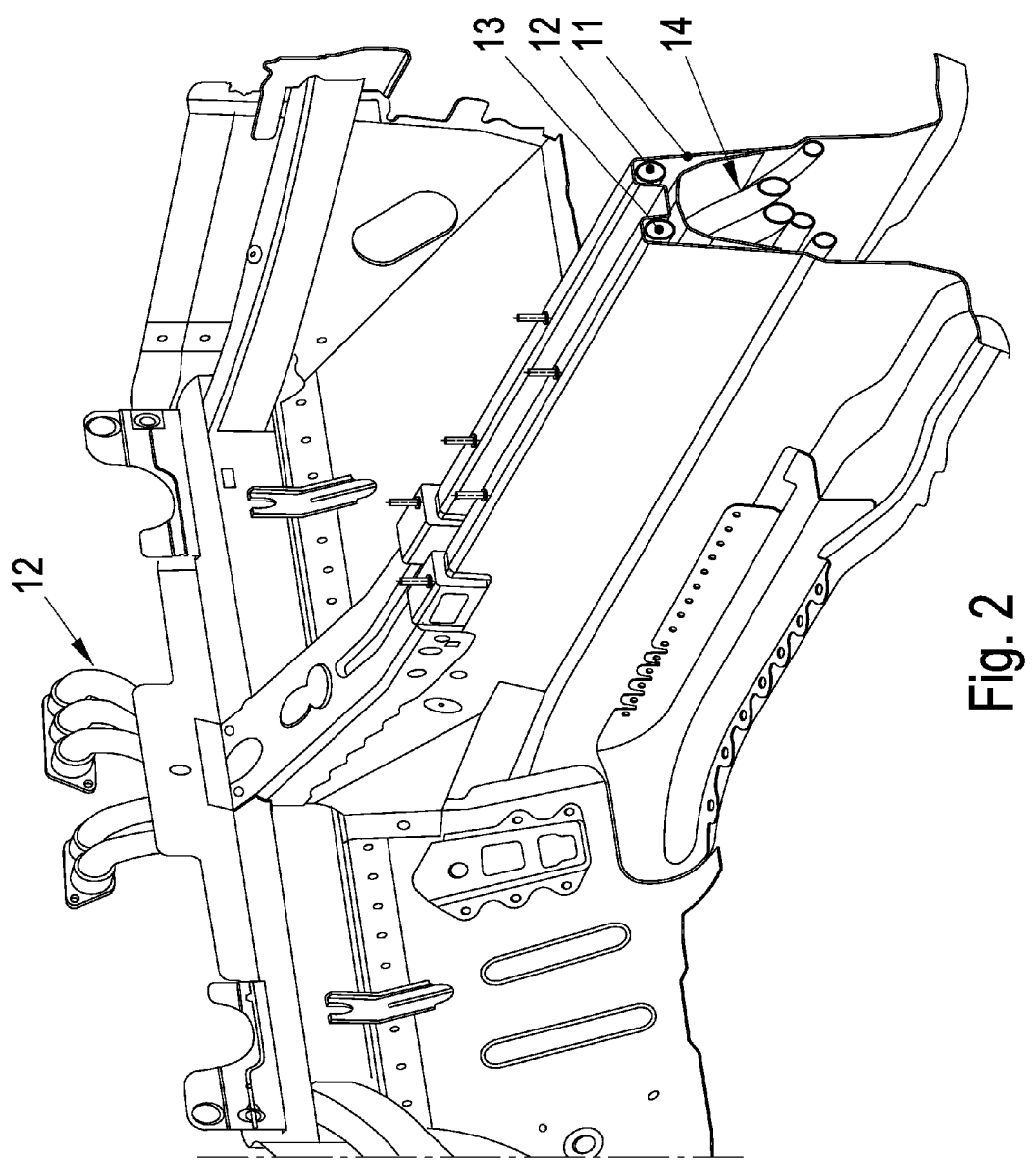
FIG. 2 is a schematic illustration of a vehicle part, such as, a central tunnel with a line arranged therein.
Figure 3:
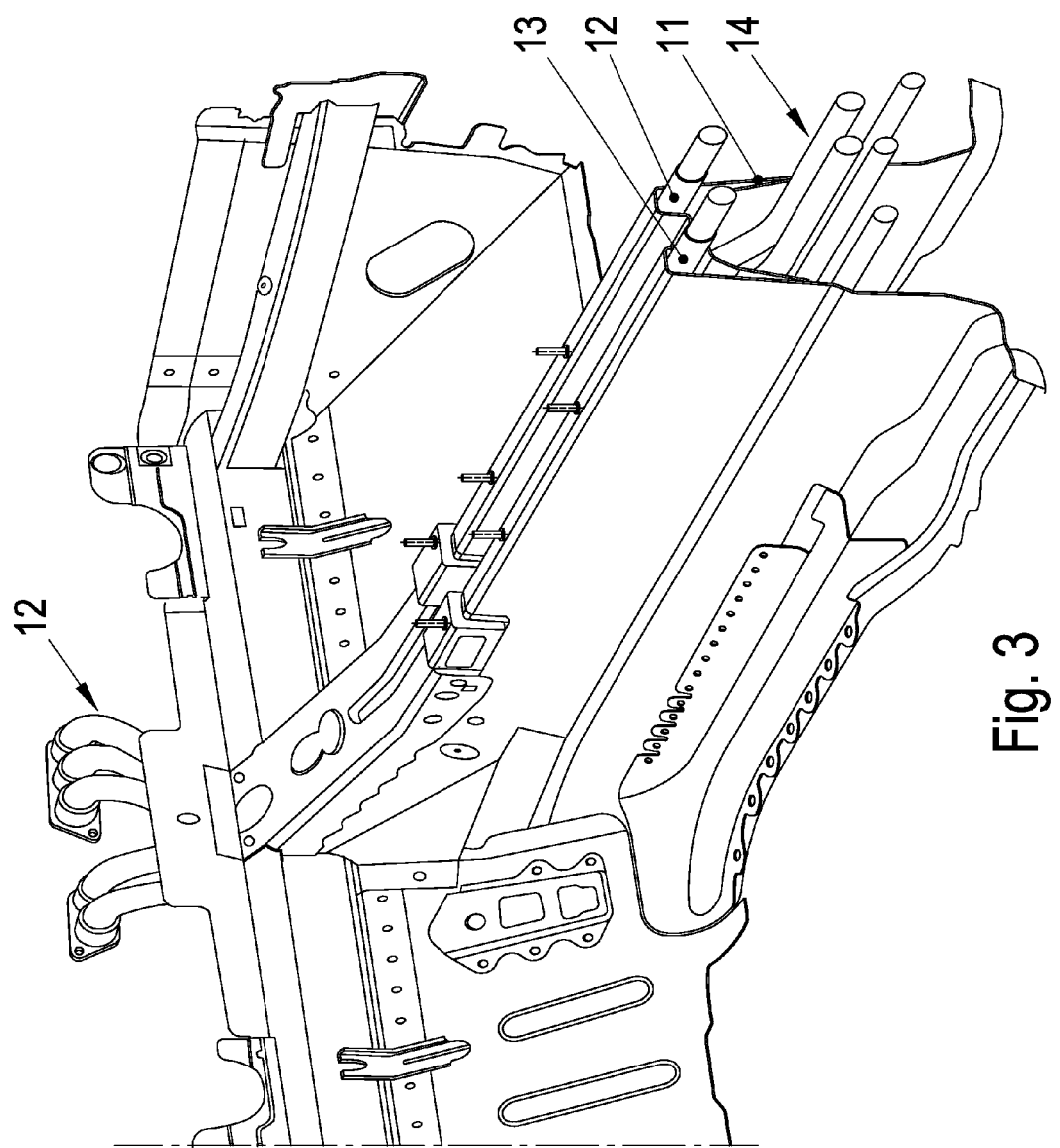
FIG. 3 is a schematic illustration of a vehicle part, such as a central tunnel with a line arranged therein.

FIGS. 2 and 3 show a further embodiment of a vehicle component comprising a fiber composite material, for example a central tunnel 11, into which lines 12, 13 are integrated by lamination. The lines 12, 13 are designed as solid rods that are insulated electrically insulation, so that electrical contact is not made with the lines 12, 13.

The lines 12, 13 project out of the fiber composite material component, so that they can be connected there. The lines 12, 13 are preferably high-voltage lines, for example for supplying a drive motor for a vehicle battery.

The central tunnel is U-shaped and, in addition to the lines 12, 13 that are incorporated by lamination, accommodates further lines 14 arranged in the hollow space in the central tunnel. The lines are routed out at the end of the central tunnel and are connected to assemblies.

As an alternative to the configuration of the fiber composite material component as a central tunnel 11, another application form can be provided, such as a floor assembly or a wall structure of a vehicle, in which electrical or other supply lines can be integrated into the fiber composite material component by lamination. In this case, it is preferred when the line 6, 7, 12, 13, 14 projects at least slightly beyond the fiber composite material component, so that the line can be connected outside the vehicle component to connect the line, for example, to another component or to connect said line to a circuit.

The fiber composite material component can be of integral design, with connecting regions being provided. The fiber composite material component to be connected to other vehicle components, such as to the elements 4, 5 of FIG. 1, for example, which are in the form of beams for the vehicle body structure.

What is claimed is:

1. A vehicle component for a motor vehicle body, comprising: a plurality of layers of a fiber composite material formed to define at least a first wall and a second wall that meet one another at an elongate intersection; and at least one solid or tubular line laminated between at least two of the layers of the fiber composite material and extending along the elongate intersection, thereby increasing rigidity of the vehicle component in proximity to the at least one line and the elongate intersection.

2. The vehicle component of claim 1, wherein the fiber composite material is a carbon fiber-reinforced plastic with a plurality of layers of carbon fibers.

3. The vehicle component of claim 1, wherein the line is a solid metal rod of aluminum or copper.

4. The vehicle component of claim 1, further comprising an insulation on the line.

5. The vehicle component of claim 1, wherein the vehicle component has at least one element of a central tunnel, a vehicle floor or a vehicle wall.

6. The vehicle component of claim 1, wherein the line is an electrical line.

7. The vehicle component of claim 6, wherein the line is a high-voltage line.

8. The vehicle component of claim 1, wherein the line of the vehicle component projects at least on one side to protrude out of the vehicle component on at least one side.

9. The vehicle component of claim 8, wherein the protruding regions are covered by a removable covering.

10. A central tunnel for a motor vehicle body, comprising: left and right side walls and an upper wall that joins upper ends of the side walls at left and right elongate intersections, the central tunnel being formed by at least first and second layers of a fiber composite material and at least one line laminated between the first and second layers of the fiber composite material and extending along at least one of the elongate intersections, thereby contributing to rigidity of the central tunnel in proximity to the at least one line.

11. The central tunnel of claim 10, wherein the line is an electrical line.

12. The central tunnel of claim 11, wherein the line is a solid metal rod of aluminum or copper.

13. A floor or wall for a motor vehicle body, comprising: at least first and second layers a fiber composite material formed to define at least two panels that intersect along at least one elongate intersection and at least one line laminated between the first and second layers of the fiber composite material and extending along at least one of the elongate intersections, thereby contributing to rigidity of the floor or the wall in proximity to the at least one line.

14. The floor or wall of claim 13, wherein the line is an electrical line.

15. The floor or wall of claim 14, wherein the line is a solid metal rod of aluminum or copper.

* * * * *